US007046400B2

(12) United States Patent
Gindele et al.

(10) Patent No.: US 7,046,400 B2
(45) Date of Patent: May 16, 2006

(54) ADJUSTING THE COLOR, BRIGHTNESS, AND TONE SCALE OF RENDERED DIGITAL IMAGES

(75) Inventors: Edward B. Gindele, Rochester, NY (US); Stephen E. Johnson, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 887 days.

(21) Appl. No.: 10/062,911

(22) Filed: Jan. 31, 2002

(65) Prior Publication Data

US 2003/0142357 A1 Jul. 31, 2003

(51) Int. Cl.
*G06K 15/00* (2006.01)

(52) U.S. Cl. ............... 358/3.27; 358/1.9; 382/254; 382/210; 382/260

(58) Field of Classification Search ............ 358/1.9, 358/3.27; 382/254, 263, 210, 260
See application file for complete search history.

(56) References Cited

U.S. PATENT DOCUMENTS

| 4,731,671 | A |   | 3/1988  | Alkofer          |
|-----------|---|---|---------|------------------|
| 4,945,406 | A |   | 7/1990  | Cok              |
| 5,012,163 | A |   | 4/1991  | Alcorn et al.    |
| 5,184,214 | A |   | 2/1993  | Tatsumi          |
| 5,261,050 | A |   | 11/1993 | Fox et al.       |
| 5,300,381 | A |   | 4/1994  | Buhr et al.      |
| 5,568,284 | A |   | 10/1996 | Oku et al.       |
| 5,633,511 | A | * | 5/1997  | Lee et al. ............... 250/587 |
| 5,822,453 | A |   | 10/1998 | Lee et al.       |
| 6,122,012 | A |   | 9/2000  | Segman           |
| 6,204,940 | B1|   | 3/2001  | Lin et al.       |
| 6,317,521 | B1|   | 11/2001 | Gallagher et al. |
| 6,335,983 | B1|   | 1/2002  | McCarthy et al.  |

FOREIGN PATENT DOCUMENTS

| EP | 1148707 | 10/2001 |
|----|---------|---------|
| EP | 1158779 | 11/2001 |

OTHER PUBLICATIONS

Spaulding et al, "Reference Input/Output Medium Metric RGB Color Encodings (RIMM/ROMM RGB)" Proc. of the Conf. on Image Processing, Image Quality and Image Capture Systems, May 26, 2000, pp. 155-163.

* cited by examiner

*Primary Examiner*—Kimberly Williams
*Assistant Examiner*—Beniyam Menberu
(74) *Attorney, Agent, or Firm*—Raymond L. Owens

(57) ABSTRACT

A method of processing a digital image to produce an enhanced digital image including receiving a source digital image; receiving a rendering tone scale function wherein the rendering tone scale function is a nonlinear function that has an absolute magnitude slope in the middle of the function domain that is greater than or equal to the absolute magnitude slope at either extreme of the function domain; and using the rendering tone scale function to calculate a de-rendering tone scale function. The method also includes receiving or calculating an adjustment tone scale function; combining the de-rendering, rendering, and adjustment tone scale functions to form an enhancement tone scale function; and using the enhancement tone scale function and the source digital image to produce an enhanced digital image.

24 Claims, 9 Drawing Sheets

ADJUSTING THE COLOR, BRIGHTNESS, AND TONE SCALE OF RENDERED DIGITAL IMAGES

FIELD OF THE INVENTION

This invention relates to digital image processing and in particular to processing a rendered digital image to enhance its color, brightness, and tone scale characteristics.

BACKGROUND OF THE INVENTION

In many digital imaging applications it is convenient to store digital images in a rendered state, i.e. digital images that have been processed for an output display device. For example, digital images rendered for a computer monitor can be displayed directly on a computer monitor and yield visually pleasing results. Similarly digital images rendered for a digital printer can be transmitted directly to the digital printer and produce pleasing photographic prints.

While rendered state digital images are convenient to use with a specific output device, a rendered state digital image prepared for one output device will generally not produce visually pleasing results when displayed or printed by a different type of output device. However, a rendered state digital image prepared for one device can be transformed such that it has been properly rendered for a different output device. This transformation usually includes a minimum of three separate transforms. The first transform changes the relationship of the pixel values through the use of a first tone scale function, i.e. a single valued function that provides an output pixel value for each input pixel value. The second transform involves a color matrix transform, which accounts for the differences in color response of two different imaging devices. The first tone scale function is designed to prepare the image pixel values in such a manner as to minimize the errors when applying the color matrix transform. The last transform is in the form of a second tone scale function that prepares the color transformed pixel values for the intended output device. The color balance, brightness balance, or contrast characteristics of the image data can be adjusted by applying a linear transform either just after the application of the first tone scale or just before the application of the second tone scale function. While the image quality of results obtained with this method of balance and contrast adjustment is better than when operating on the rendered state digital image data directly, there still can be unwanted color casts imparted to the image data most often experienced in the highlight and shadow regions of images. In particular, the color cast and contrast artifacts can arise for digital images that had been previously rendered using a photographic "S" shaped rendering curve.

It is known in the art that video digital images, i.e. digital images prepared to look good on a computer monitor, can be processed to change their overall brightness and color balance. The first tone scale transform takes the form of an exponential equation or power law function designed to mimic the response of the a typical computer monitor. Since for this application the input and output device are the same, a color matrix transform is not required to account for the differences between the color response of input and output devices. The image data are then converted into a logarithmic domain with a tone scale function. Next, the image data is modified with a linear transform tone scale function to change the image brightness and/or color characteristics. Next, the image data are converted from the logarithmic domain back to a linear domain with a tone scale function. The last step is the application of another exponential tone scale function calculated as the inverse of the first exponential tone scale function. This method also can produce unwanted color casts and contrast artifacts in the processed images, particularly if the digital images had been previously rendered using a photographic "S" shaped rendering curve.

In U.S. Pat. No. 5,184,214, Tatsumi describes an apparatus for editing video images on a video processing console and preparing the images for a photographic printer. The described apparatus processes an input image signal from an image signal source, such as a television camera, to produce an output image signal to record an image on an image recording medium. The input image signal is logarithmically converted into an image signal which matches the image output system using a first look-up table which is selected to match the image signal source. The image signal is then modified with a linear transform to adjust the color and brightness image characteristics. Next, a second look-up table, which is selected to match the image recording medium, is applied to the image signal. Three exponential brightness parameters are determined which form three separate exponential color functions. These exponential color functions are applied to the image signal to achieve an overall desired tone scale. While the method disclosed by Tatsumi is designed to work for video images and for scanned film images, it was not designed to handle digital images that have been previously rendered using a photographic "S" shaped rendering curve.

It is also known in the art that color transparency material can be scanned by a photographic film scanner, modified for its color and brightness balance characteristics and prepared for an output device. The scanned digital image is processed by a first tone scale function designed to have a shape that is the inverse response of the "S" shaped response of the color transparency material. The image data are then modified with a linear transform that can modify the color balance, brightness balance, and contrast image characteristics. The image data are then prepared for display on a computer monitor or digital printer. First, a color transform in the form of a three by three matrix is applied to the image data. The color transform accounts for the differences in the color response of the color transparency material and the intended output device. Next, the image data is modified with a photographic "S" shaped second tone scale function for pleasing photographic results. When processing the image data for a computer monitor, a third tone scale function is applied. This third tone scale function prepares the image data for the computer monitor using an exponential formula designed to be the inverse response of the computer monitor. When processing the image data for a digital printer, the third tone scale function is calculated based on the response of the digital printer. While good photographic image balance and contrast results can be obtained with this method for a particular type of source material and particular output device, it is not designed to adjust the balance and contrast characteristics of a digital image wherein the enhanced digital image is in the same color metric as the original digital image.

SUMMARY OF THE INVENTION

It is therefore an object of the present invention to provide an improved scheme for enhancing already rendered digital images.

This object is achieved by a method of processing a digital image to produce an enhanced digital image, comprising the steps of:

a) receiving a source digital image;
b) receiving a rendering tone scale function wherein the rendering tone scale function is a nonlinear function that has an absolute magnitude slope in the middle of the function domain that is greater than or equal to the absolute magnitude slope at either extreme of the function domain;
c) using the rendering tone scale function to calculate a de-rendering tone scale function;
d) receiving or calculating an adjustment tone scale function;
e) combining the de-rendering, rendering, and adjustment tone scale functions to form an enhancement tone scale function; and
f) using the enhancement tone scale function and the source digital image to produce an enhanced digital image.

ADVANTAGES

The present invention is useful for enhancing digital images that have been previously rendered with a tone scale function, i.e. the tone scale function having been applied to achieve an aim rendering appearance. In particular, digital images processed with the present invention can be adjusted for brightness balance, color balance, and contrast while maintaining the aim rendering appearance while not imparting unwanted color saturation artifacts or color balance artifacts, particularly in image shadow and highlight areas.

A significant advantage of the present invention is derived from the step of combining a de-rendering, a rendering, and an adjustment tone scale function into a single enhancement tone scale function that can be used to perform image enhancement adjustments in a computationally efficient manner.

DETAILED DESCRIPTION OF THE INVENTION

In the following description, a preferred embodiment of the present invention will be described as a software program. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein, may be selected from such systems, algorithms, components and elements thereof known in the art. Given the description as set forth in the following specification, all software implementation thereof as a computer program is conventional and within the ordinary skill in such arts.

Still further, as used herein, the computer program may be stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A digital image is comprised of one or more digital image channels. Each digital image channel is comprised of a two-dimensional array of pixels. Each pixel value relates to the amount of light received by the imaging capture device corresponding to the geometrical domain of the pixel. For color imaging applications, a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications.

Although the present invention describes a digital image channel as a two-dimensional array of pixels values arranged by rows and columns, those skilled in the art will recognize that the present invention can be applied to mosaic (non-rectilinear) arrays with equal effect.

Figure 1:
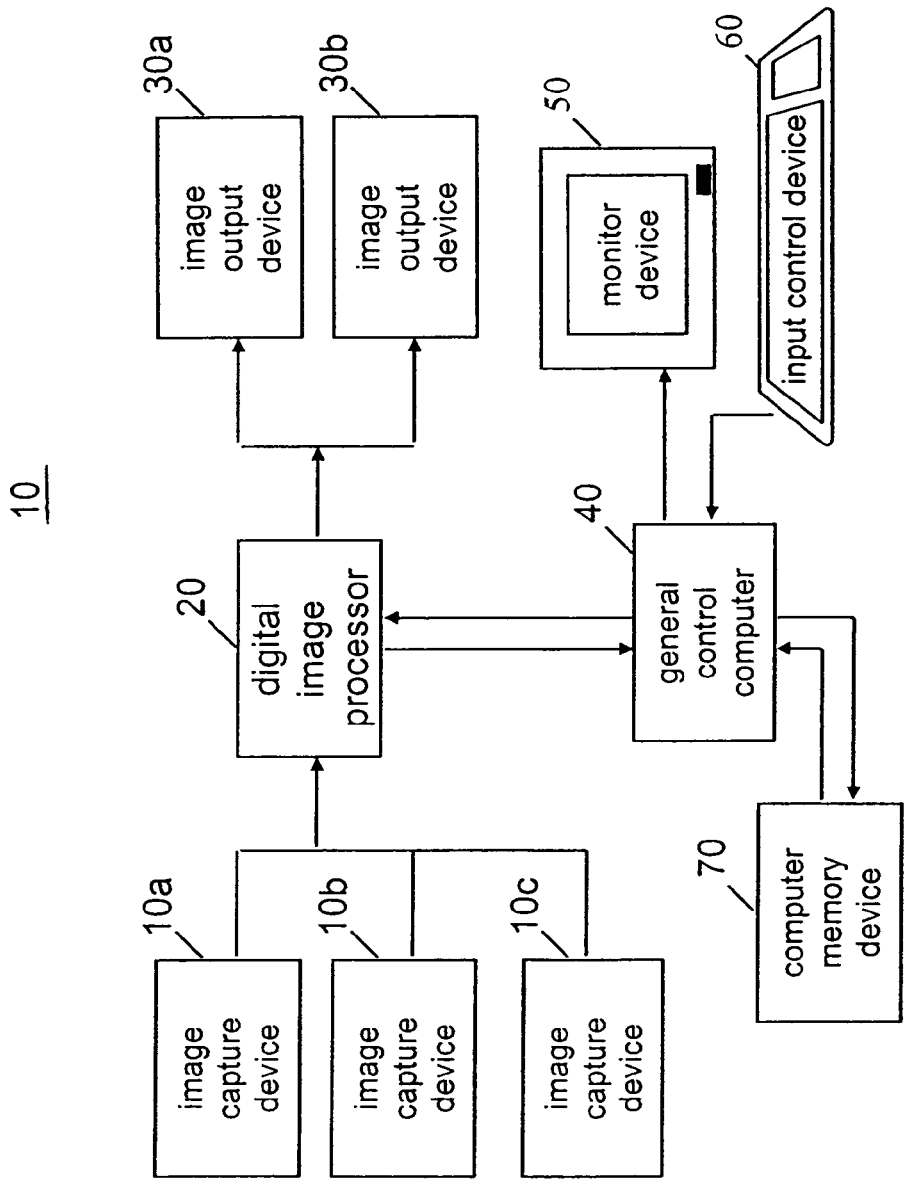
FIG. 1 is a functional block diagram showing the component parts of an apparatus implementation of the present invention.

The present invention may be implemented in computer hardware. Referring to FIG. 1, the following description relates to a digital imaging system which includes an image capture device 10, a digital image processor 20, image output devices 30a and 30b, and a general control computer 40. The system may include a monitor device 50 such as a computer console or paper printer. The system may also include an input device control 60 for an operator such as a keyboard and or mouse pointer. Still further, as used herein, the present invention may be implemented as a computer program and may be stored in a computer memory device 70, i.e. a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. Before describing the present invention, it facilitates understanding to note that the present invention is preferably utilized on any well known computer system, such as a personal computer.

Multiple capture devices 10a, 10b, and 10c are shown illustrating that the present invention may be used for digital images derived from a variety of imaging devices. For example, FIG. 1 may represent a digital photofinishing system where the image capture device 10a may be a film scanner device which produces digital images by scanning a conventional photographic image, e.g. color negative film or slide film transparencies. Similarly, image capture device 10b could be a digital camera. The digital image processor 20 provides the means for processing the digital images to produce pleasing looking images on an intended output device or media. Multiple image output devices 30a and 30b are shown illustrating that the present invention may be used in conjunction with a variety of output devices which may include a digital photographic printer and soft copy display.

A tone scale function, as defined within the context of the present invention, refers to a single valued function. Thus, for each unique input value to a tone scale function there is a corresponding output value. The present invention implements tone scale functions as a look-up-table LUT used to transform the discrete pixel values of a digital image from an input value to an output value. However, those skilled in the art will recognize that a tone scale function can just as easily be implemented as a series of mathematical operations. The inverse of a tone scale function is that tone scale function which can reproduce the input value from the output value. Mathematically the inverse of a tone scale function $T^{-1}(\ )$ can be expressed as (1)

$$x = T^{-1}(T(x)) \quad (1)$$

where:

T( ) represents the tone scale function; and
x represents the input value.

The domain of a tone scale function refers to the range of input values that are valid. The extremes of the tone scale function domain refer to the minimum and maximum input values for which the tone scale function can be evaluated. It is important to note that while a tone scale function can be a single valued function, its corresponding inverse tone scale function may not be a single valued function.

The present invention implicitly relies on the calculation of an inverse of a tone scale function. Given a tone scale function T( ) and domain defined by $X_{min}$ (a minimum domain value) and $X_{max}$ (a maximum domain value), an inverse tone scale function $T^{-1}(\ )$ can be calculated by an iterative process. First, the domain $T^{-1}(\ )$ is determined by evaluating T(x) for all values of x greater than or equal to $X_{min}$ and less than or equal to $X_{max}$. The minimum and maximum evaluation values of T( ) are found as $Y_{min}$ and $Y_{max}$ respectively. For all values y ranging from $Y_{min}$ to $Y_{max}$ the closest T(x) value to y that is less than or equal to y is found. The value of the inverse function $T^{-1}(y)$ is given by the corresponding x value. Those skilled in the art will recognize that there are other methods of calculating the inverse of a tone scale function that can be practiced with the present invention.

Figure 2:
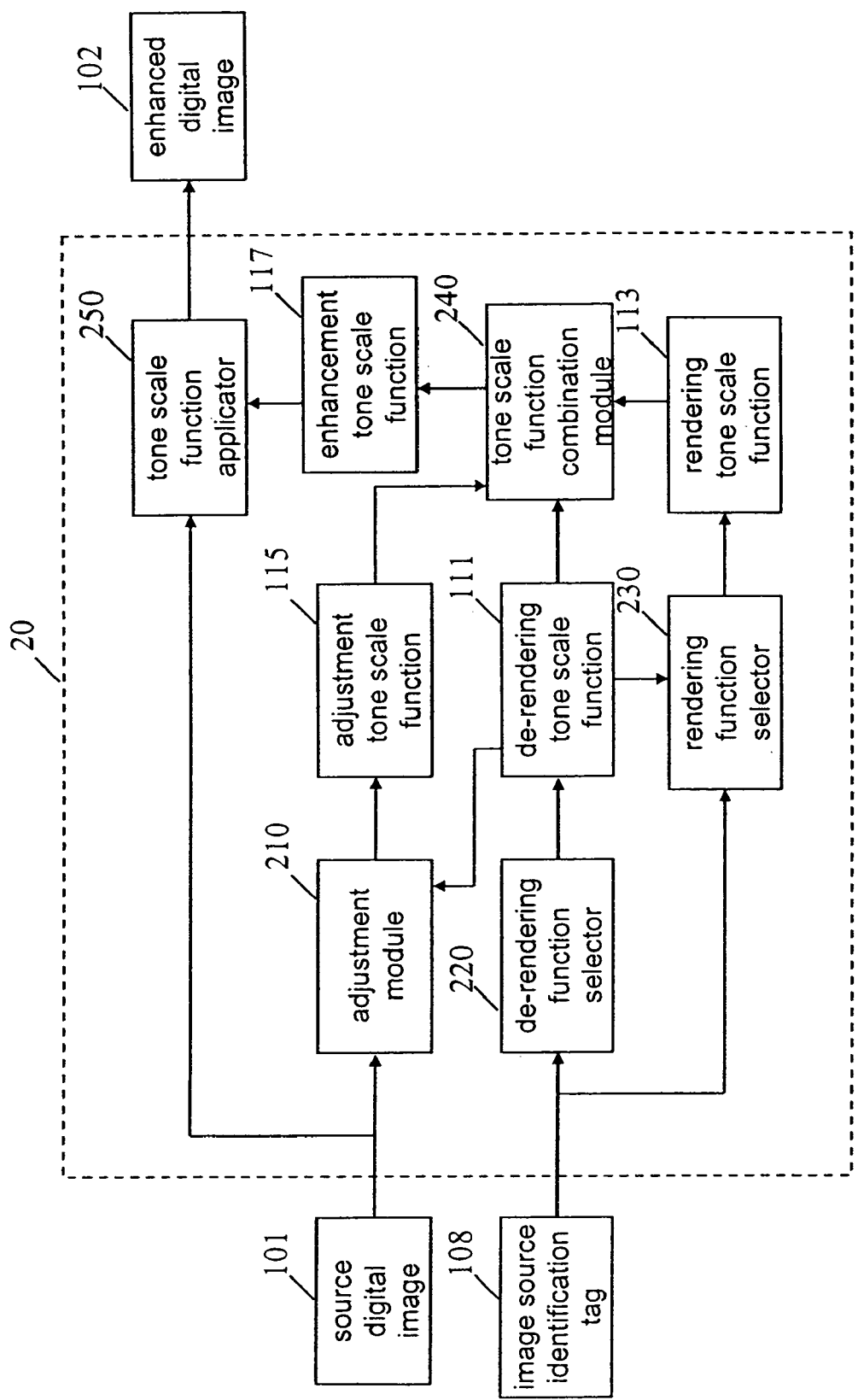
FIG. 2 is a functional block diagram of the digital image processor.

The digital image processor 20 shown in FIG. 1 is illustrated in more detail in FIG. 2. The source digital image 101 and its associated image source identification tag 108 are received by the image capture device 10. The image source identification tag 108 is the piece of information that uniquely identifies what type of device produced the source digital image 101 and can be stored with the source digital image 101 as meta-data (non-pixel image data). The de-rendering function selector 220 uses the image source identification tag 108 to select a de-rendering tone scale function 111 from a plurality of predetermined de-rendering tone scale functions. The plurality of de-rendering tone scale functions are predetermined to correspond to a variety of different image capture devices. However, it should be noted that different source identification tags may cause the selection of the same de-rendering function 111.

In similar fashion, the image source identification tag 108 is received by the rendering function selector 230 which selects a rendering tone scale function 113 from a plurality of predetermined rendering tone scale functions. Each of the rendering tone scale functions corresponds to the one of the de-rendering tone scale functions. The de-rendering tone scale function 111 is the mathematical inverse of the corresponding rendering tone scale function 113. The present invention stores both the de-rendering and rendering tone scale functions in computer memory. However, since these pairs of tone scale functions are mathematical inverses of one another, one can be mathematically calculated from the other. The present invention starts with a rendering tone scale function and calculates its corresponding de-rendering tone scale function.

For digital imaging applications that accept source digital images that have no source identification tag 108, the present invention uses a default rendering tone scale function to process the source digital image 101.

The adjustment module 210 receives the source digital image 101 and the de-rendering tone scale function 111 and calculates an adjustment tone scale function 115. It should be noted that the present invention can also be used in a mode wherein the adjustment tone scale function is received. For example, the adjustment tone scale function can be generated by a different device or selected from a set of predetermined adjustment tone scale functions. The tone scale function combination module 240 receives the adjustment tone scale function 115, de-rendering tone scale function 111, and the rendering tone scale function 113, and generates an enhancement tone scale function 117. The tone scale function applicator 250 receives the enhancement tone scale function 117 and the source digital image 101 and applies the enhancement tone scale function 117 to the source digital image 101 resulting in an enhanced digital image 102.

The present invention considers rendering tone scale functions to be a particular subset of mathematical functions. The salient characteristics of a rendering tone scale function that sets them apart from other functions include the following features. For a function to be considered a rendering tone scale function it must be a nonlinear function that has an absolute magnitude slope in the middle of the function domain that is greater than or equal to the absolute magnitude slope at either extreme of the function domain. For example, an "S", or sigmoidal, shaped function would be considered, in the context of the present invention, a rendering tone scale function. The "S" shaped rendering tone scale function shown in the graph of FIG. 3 has a low magnitude positive slope as the input domain values approach the domain extremes and a higher magnitude positive slope in the middle of the domain. The "S" shaped rendering tone scale function shown in the graph of FIG. 4 has a low magnitude negative slope as the input domain values approach the domain extremes and a higher magnitude negative slope in the middle of the domain. Thus, a rendering tone scale function can have either a positive or negative overall slope.

Figure 3:
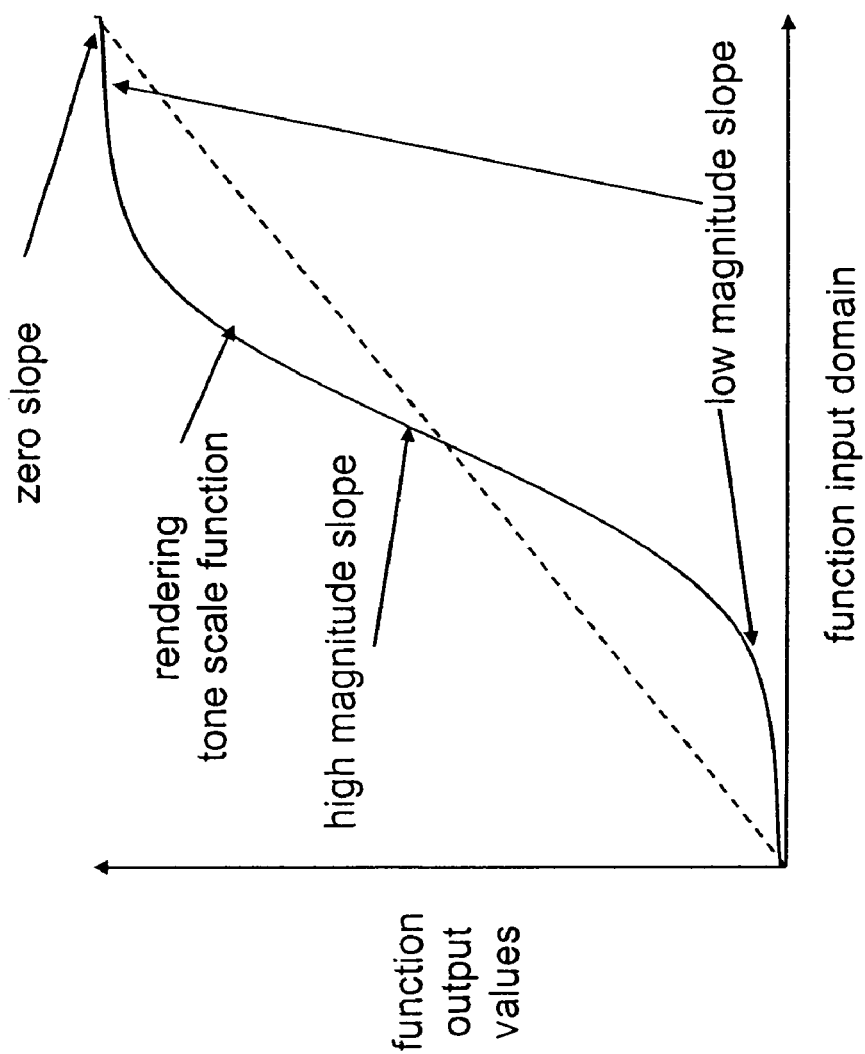
FIG. 3 is a graph that shows an example of a rendering tone scale function plotting function output values vs. function input domain.
Figure 4:
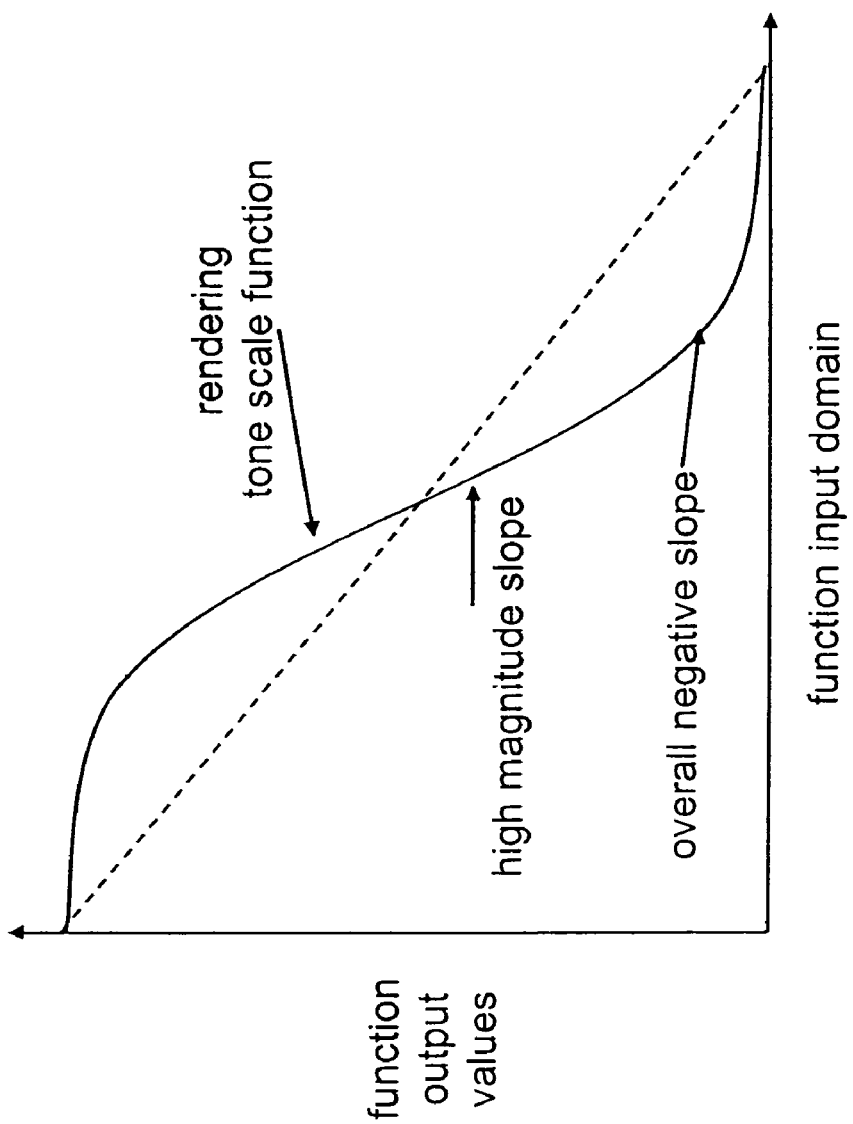
FIG. 4 is another graph illustrating an example of a rendering tone scale function plotting function output values vs. function input domain.
Figure 5:
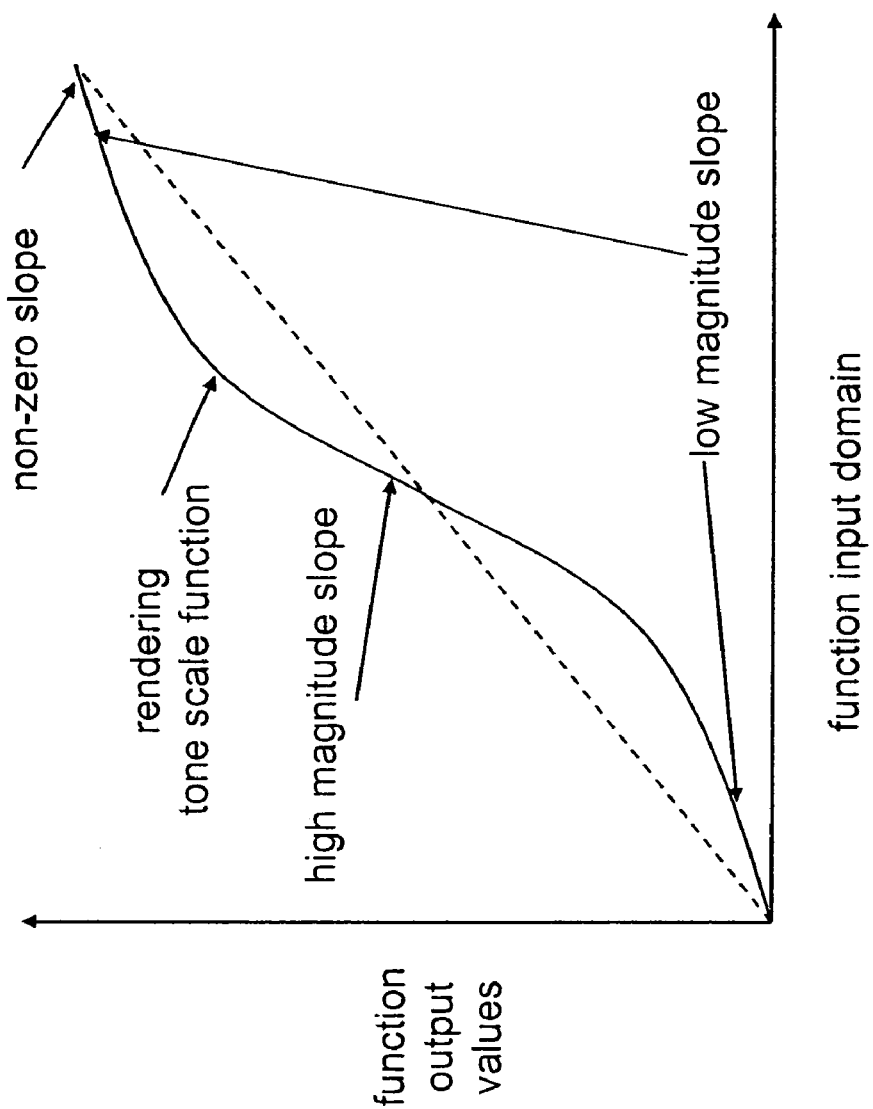
FIG. 5 is also another graph illustrating an example of a rendering tone scale function plotting function output values vs. function input domain.

The rendering tone scale function shown in FIG. 3 and FIG. 4 achieves a zero slope condition at the extremes of the function domain. However, a function does not have to achieve a zero slope condition to be considered a rendering tone scale function. The function illustrated in the graph of FIG. 5 is considered a rendering tone scale function and does not achieve a zero slope condition anywhere in the function domain.

Figure 6:
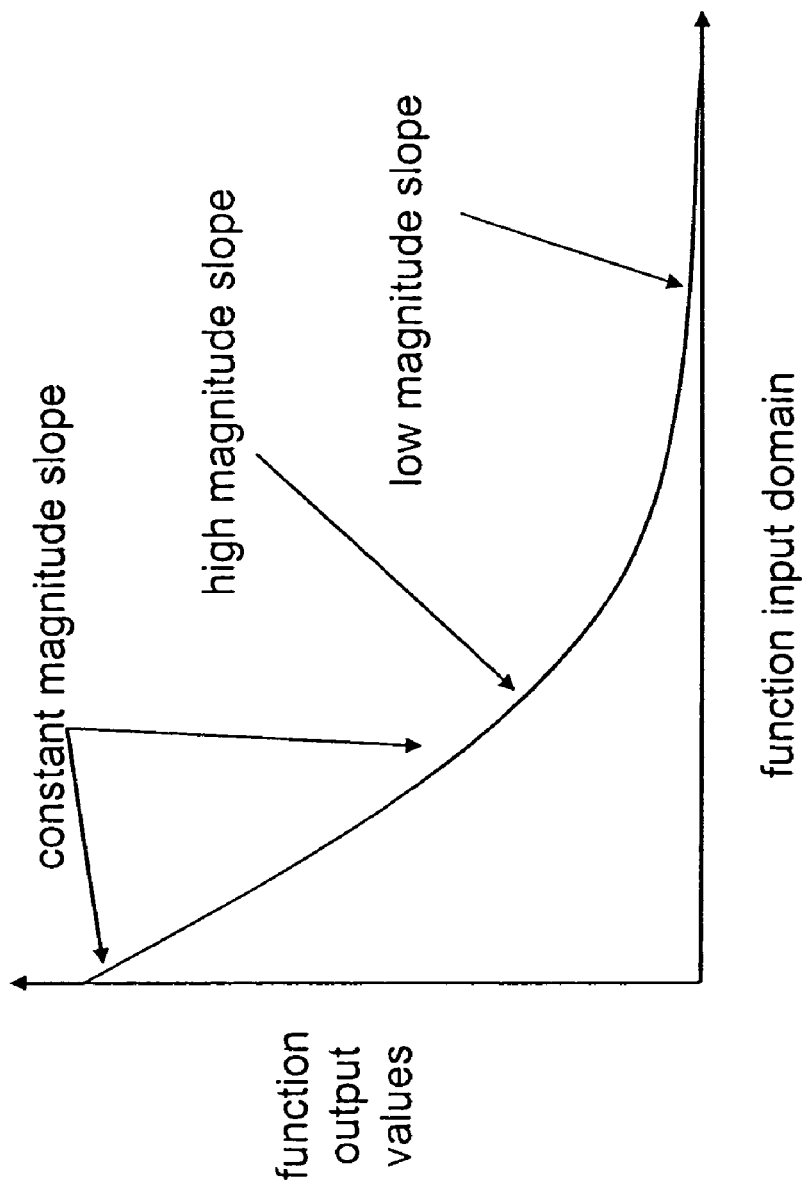
FIG. 6 is also another graph illustrating an example of a rendering tone scale function plotting function output values vs. function input domain.

The functions disclosed in U.S. Pat. No. 5,300,381 by Buhr et al. are also considered, in the context of the present invention, rendering tone scale functions. An example of a rendering tone scale function constructed by Buhr's method is illustrated in the graph of FIG. 6. The rendering tone scale function shown in FIG. 6 has a higher magnitude slope in the middle of the function domain than for the high numerical input values (relating to image highlight regions). The rendering tone scale function shown in FIG. 6 has an equal magnitude slope for the low numerical input values (relating to image shadow regions) to the magnitude slope for the middle of the function domain. Thus, a tone scale function can have a constant slope from the middle of the function domain as input values approach one of the domain extreme.

Figure 7:
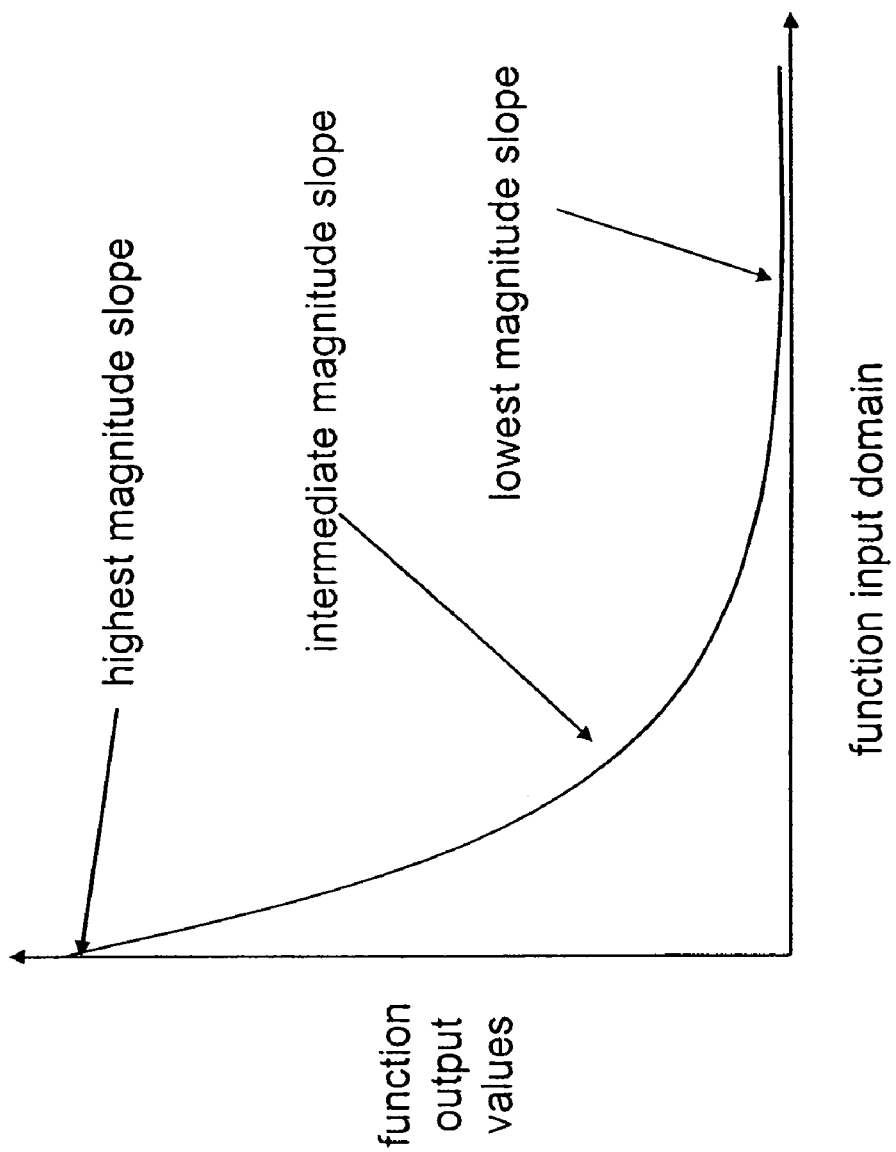
FIG. 7 is a graph illustrating an example of a function which is not a rendering tone scale function plotting function output values vs. function input domain.
Figure 8:
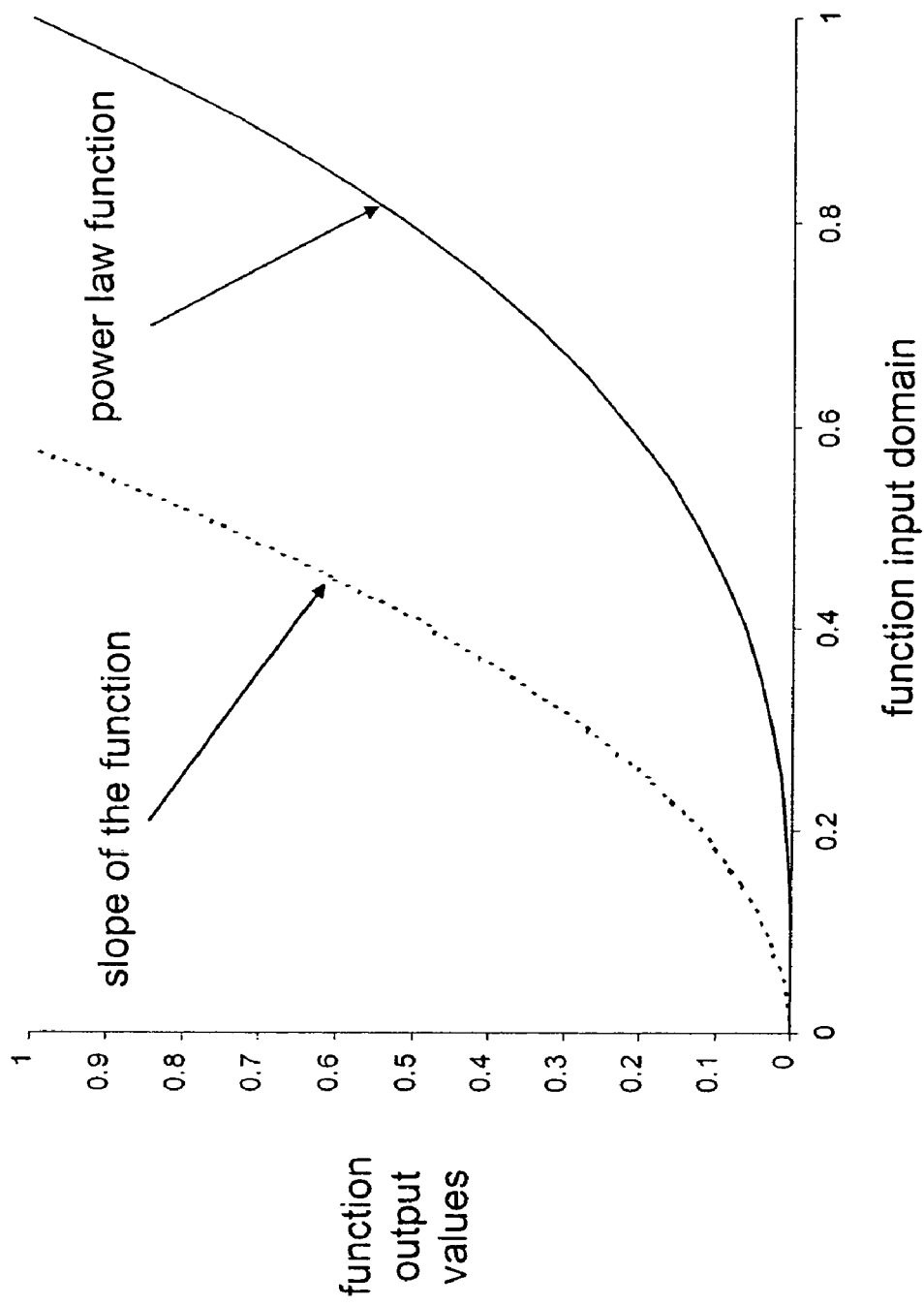
FIG. 8 is similar to FIG. 7, but illustrates a graph of a different function which is not a rendering tone scale function.

Some tone scale functions used in digital image processing applications are not considered, in the context of the present invention, to be rendering tone scale functions. For example, a linear function would not be considered a rendering tone scale function since it has a constant slope over the entire function domain. The exponential function using the formula (2)

$$f(x)=e^{-x} \qquad (2)$$

shown in the graph of FIG. 7 would not be considered a rendering tone scale function since this function achieves its highest magnitude slope at the low domain extreme. Similarly, the power law exponential function using the formula (3)

$$f(x)=x^n \qquad (3)$$

shown in the graph of FIG. 8 would not be considered a rendering tone scale function since this function achieves its highest magnitude slope at the high domain extreme. The slope of the power law exponential function is also illustrated in FIG. 8 and shows that the slope steadily increases from the low extreme domain value to the high extreme domain value.

Referring to FIG. 2, the adjustment module 210 receives the source digital image 101 and the de-rendering tone scale function 111 and calculates an adjustment tone scale function 115. The adjustment tone scale function 115 can be constructed to alter the color balance, brightness balance, and contrast of images. The present invention uses a linear equation for the adjustment tone scale function A( ) to achieve the image enhancement effects in the formula (4)

$$A(x)=\alpha(x-x_o)+x_o+\beta \qquad (4)$$

where:
the term $\alpha$ determines the degree of contrast adjustment; and
the term $\beta$ determines the degree of brightness adjustment;
$x_o$ represents a reference gray value about which the contrast is changed; and
x represents the input pixel value.

For color digital images, a separate adjustment tone scale 115 is calculated for each color represented in the source digital image 101. The separate brightness adjustment terms $\beta$ determine the changes to the color balance of the processed digital images.

The preferred embodiment of the present invention uses a scene balance algorithm to automatically determine the color balance terms $\beta$ for the red, green, and blue colors of the source digital image 101. The present invention uses a modified form of the method described by Cok et al. in U.S. Pat. No. 4,945,406. The scene balance algorithm calculates the pixel values corresponding to a theoretical 18% gray card reflector using the pixels of the source digital image 101. This method includes the steps of: i) calculating a low resolution version of the source digital image; ii) applying the selected de-rendering tone scale function 111 to the low resolution version of the source digital image; and iii) calculating color balance terms $\beta$ from the modified low resolution version of the source digital image.

An alternative embodiment of the present invention allows an operator to set the color balance terms $\beta$ manually. A low resolution version of the source digital image is calculated and display on the monitor device 50. The operator makes selections via a graphical user interface displayed on the monitor device 50 and indicates selections via the input control device 60. The operator selections are used to set the color balance terms $\beta$ for the three colors. The color balance terms $\beta$ are used to calculate the adjustment tone scale function 115, which is used to generate an enhancement tone scale function 117. The low resolution image is processed in the same manner as the source digital image 101 with the enhancement tones scale function 117 and displayed on the monitor device 50.

The preferred embodiment of the present invention allows an operator to set the contrast term $\alpha$ manually in the same fashion as the manual method for setting the color balance terms $\beta$.

An alternative embodiment of the present invention uses a combination of the methods disclosed in U.S. Pat. Nos. 4,731,671 and 5,822,453 to calculate the adjustment tone scale function using the pixel values of the source digital image. These methods are employed by the present invention to produce two individual contrast tone scale functions. These two contrast tone scale functions are then cascaded into single contrast tone scale function. The first contrast tone scale function is calculated using the pixel values of source digital image 101 based on normalizing the histogram of a source digital image 101. This method involves determining a contrast parameter for the source digital image by calculating the standard deviation of a sample of pixel values. The second contrast tone scale function is calculated by normalizing a histogram of the sample of pixels values. The sample of pixel values is selected from one of a plurality of samples of pixel values corresponding to a plurality of contrast intervals based upon the shape of the histogram of the selected sample of pixel values. To facilitate the adjustment of contrast, the tone scale function is constructed to produce values in units of a standard normal variate Z. These Z values are then multiplied by a constant, which is a function of the standard deviation of the sample of pixel values to determine the contrast of the processed digital image.

The first and second contrast tone scale functions are combined into a single contrast tone scale function using the mathematical formula (5)

$$i\ C_f(\ )=C_1(C_2(x)) \qquad (5)$$

where:
C$_2$ represents the second contrast tone scale function;
C$_1$ represents the first contrast tone scale function;
C$_f$ represents the final contrast tone scale function; and
the x variable represent the input values.

The final contrast tone scale function C$_f$( ) is combined with the adjustment tone scale function 115 A( ) as (6)

$$A'(\ )=C_f(A_f(x)) \quad (6)$$

where A'( ) represents the modified adjustment tone scale function 115 and, in general, represents a nonlinear equation.

Referring to FIG. 1, the tone scale function combination module 240 receives the de-rendering tone scale function 111 represented by R$^{-1}$( ), the rendering tone scale function 113 represented by R( ), and the adjustment tone scale function represented by A( ) and generates an enhancement tone scale function 117 represented by E( ). The mathematical formula for generating E( ) is given by (7)

$$E(x)=R(A(R^{-1}(x))). \quad (7)$$

The order of the applied functional operations is very important. The cascading of the three tone scale functions into one tone scale function has the same affect on image pixel data as if the three tone scale functions were applied sequentially. The first operation using the de-rendering tone scale function R$^{-1}$( ) has the effect of transforming the input pixel value x into a de-rendered pixel value. It is presumed the image capture device 10 performed a series of pixel transforms to produce the source digital image 101. In particular, it is presumed that one of those pixel transforms included the application of an "S" shaped tone scale function. Thus, the application of the de-rendering tone scale function R$^{-1}$( ) has the effect of undoing the application of the tone scale function within the image capture device 10. The adjustment tone scale function is best applied to pixel data when it is in the "de-rendered state". This is due to the fact that a simple linear transform can correct for an overall color cast or an overall brightness condition while the image data is in the "de-rendered state". Image pixel data in a "de-rendered state" can have a linear of logarithmic relationship to the original scene intensity values. The rendering tone scale function R( ) is applied last. The overall effect of the three tone scale functions is nearly the same as if the color, brightness, and contrast adjustments had been performed within the image capture device 10 prior to the image capture device applying "S" shaped tone scale function.

It is important to note that the rendering tone scale function R( ) be a reasonable approximation to the "S" shaped tone scale function applied within the image capture device 10. Since different image capture devices can use very different "S" shaped tone scale functions, the present invention uses a data base of rendering and de-rendering tone scale functions. The closer the rendering tone scale function R( ) and the "S" shaped tone scale function applied within the image capture device are, the better the imaging performance. When these two tone scale functions are perfectly matched, color balance artifacts are minimized. If these two tone scale functions are grossly mismatched, color artifacts of unwanted colors, particularly in the highlight regions of the processed digital images occur.

It is also important to note that while the present invention achieves its best results when the rendering tone scale function R( ) and the "S" shaped tone scale function applied within the image capture device are matched, very good results are still achievable when these two tone scale functions are slightly mismatched. This is mainly due to the fact that the de-rendering tone scale function and the rendering tone scale function are mathematical inverses of one another. This condition also helps to minimize the color artifacts produced when the rendering tone scale function R( ) and the "S" shaped tone scale function applied within the image capture device are mismatched. The present invention achieves better color balance results through the use of the de-rendering and rendering tone scale functions than the method of directly applying the adjustment tone scale function 115 to the source digital image 101, even when the rendering tone scale function R( ) and the "S" shaped tone scale function applied within the image capture device are mismatched.

It should also be noted that if no adjustments are made, i.e. the adjustment tone scale function 115 is an identity tone scale function, the net effect of the present invention is to leave the source digital image 101 unaltered.

Digital cameras produce rendered digital images that can be displayed directly on a computer monitor. A typical digital image processing procedure for digital camera manufacturers includes the application of a rendering tone scale function to the image data and subsequent application of an exponential tone scale function using the normalized equation (3) with an n parameter of approximately 0.42.

Figure 9:
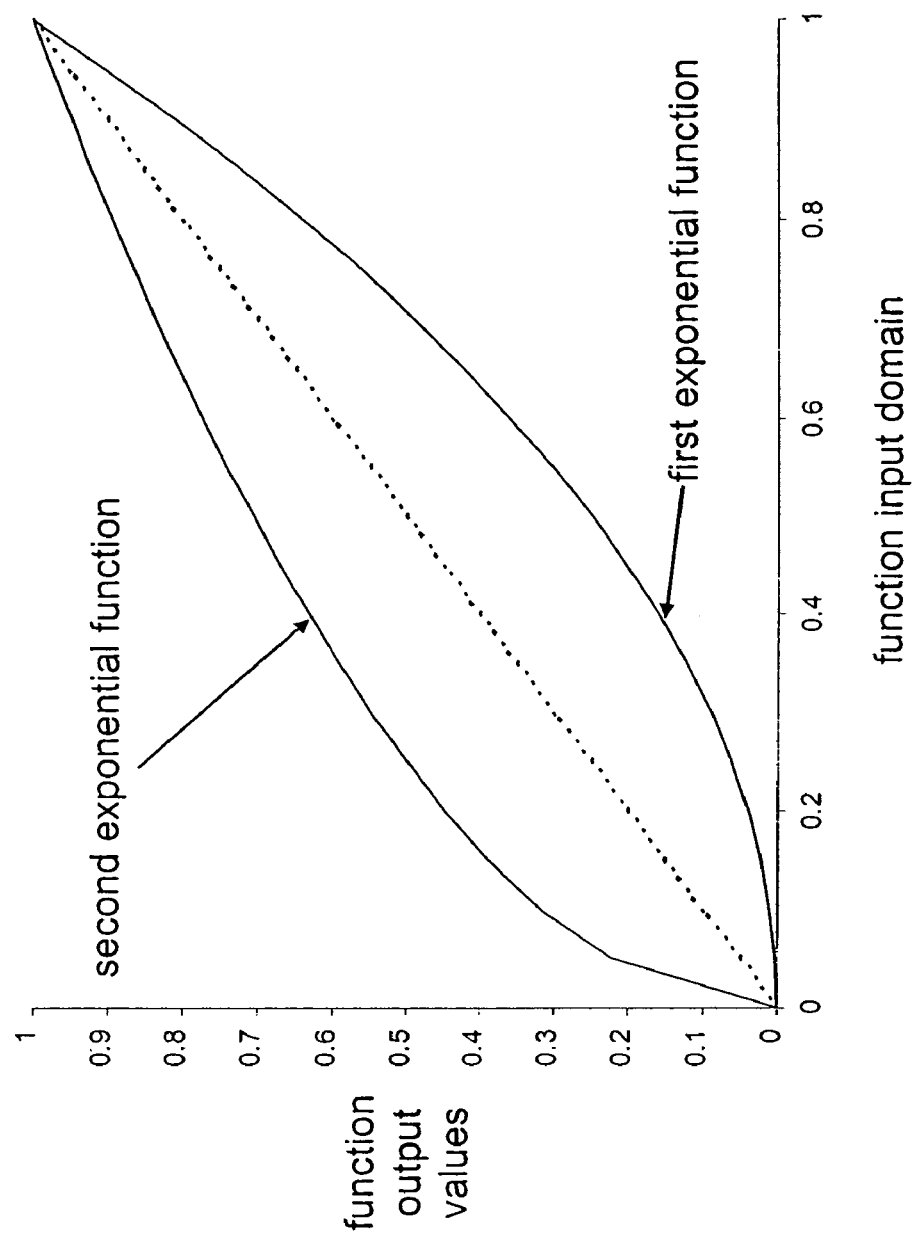
FIG. 9 illustrates in graph format exponential functions used in an alternative embodiment of the present invention.

In an alternative embodiment of the present invention, a first exponential tone scale function F$_1$( ), as illustrated in the graph of FIG. 9, using the normalized equation (3) with an n parameter of 2.4 is used as pre-processing tone scale function for the enhancement tone scale function 117 described above. A second exponential tone scale function F$_2$( ) as illustrated in FIG. 9, using the normalized equation (3) with an n parameter of 0.42 is used as post-processing tone scale function for the enhancement tone scale function 117 described above. The resultant enhanced tone scale function 117 E'( ) for this alternative embodiment is given by formula (8)

$$E'(x)=F_2(R(A(R^{-1}(F_1(x))))). \quad (8)$$

The pre-processing application of the first exponential tone scale function F$_1$( ) undoes the last processing step performed by many digital camera manufacturers. The post-processing application of the second exponential tone scale function F$_2$( ) reapplies the last processing step performed by many digital camera manufacturers. The pre- and post-processing steps make the present invention compatible with source digital images produced by digital cameras while achieving the color, brightness, and contrast adjustment. It should also be noted that the first and second exponential tone scale functions can be mathematical inverses of one another. (It is possible to use a different n parameter for the first and second exponential tone scale functions.) The resultant enhanced digital images 102 can be displayed on a computer monitor or printed on a digital printer just as the original source digital images 101. However, the enhanced digital images 102 are of high quality since their color, brightness, and contrast characteristics have been adjusted.

The method employed by the present invention of combining the de-rendering, adjustment, and rendering tone scale functions together into a single enhancement tone scale function and applying the enhancement tone scale function to the source digital image is a fast computational method. However, if the adjustment tone scale function has a highly nonlinear shape, improved results can be produced by using a spatial filter to apply the adjustment tone scale function. The present invention applies the de-rendering tone scale function 111 to the source digital image 101 to produce a de-rendered digital image. A spatial filter is used to apply the adjustment tone scale function 115 to the de-rendered digital image to produce an adjusted de-rendered digital image. The rendering tone scale function 113 is then applied to the adjusted de-rendered digital image to produce the enhanced digital image 102.

The present invention uses the spatial filtering method disclosed in U.S. Pat. No. 6,317,521 by Gallagher and Gindele to apply the adjustment tone scale function 115 to the de-rendered digital image. This spatial filtering method includes the steps of: transforming the de-rendered digital image into a luminance-chrominance signal representation; spatial filtering the luminance signal digital image with a spatial filter which varies with location according to a control signal producing a space-variant spatial filtered version of the luminance signal; applying the adjustment tone scale function to the space-variant spatial filtered version of the luminance signal; and transforming the tone scale adjusted space-variant spatial filtered version of the luminance signal and the chrominance signals to produce the adjusted de-rendered digital image.

The present invention uses the spatial filtering method described above for source digital images wherein the digital image processing procedure includes the application of a rendering tone scale function to the image data and the subsequent application of an exponential tone scale function using the normalized formula (3). For this embodiment, a combined de-rendering tone scale function is generated by cascading the first exponential tone scale function $F_1(\ )$ with the de-rendering tone scale function 111 $R^{-1}(\ )$ as $R^{-1}(F_1(\ ))$. Similarly, a combined rendering tone scale function is generated by cascading the rendering tone scale function 113 $R(\ )$ and the second exponential tone scale function $F_2(\ )$ as $F_2(\ Ro(\ ))$. In similar fashion as described above, the combined de-rendering tone scale function is applied to the source digital image 101 to produce a de-rendered digital image. The spatial filter described above is used to apply the adjustment tone scale function 115 to the de-rendered digital image to produce an adjusted de-rendered digital image. The combined rendering tone scale function is then applied to the adjusted de-rendered digital image to produce the enhanced digital image 102.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention.

Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST

10 image capture device
10*a* image capture device
10*b* image capture device
10*c* image capture device
20 digital image processor
30*a* image output device
30*b* image output device
40 general control processor
50 monitor device
60 input control device
70 computer memory device
101 source digital image
102 enhanced digital image
108 image source identification tag
111 de-rendering tone scale function
113 rendering tone scale function
115 adjustment tone scale function
117 enhancement tone scale function
210 adjustment module
220 de-rendering function selector
230 rendering function selector
240 tone scale function combination module
250 tone scale function applicator

What is claimed is:

1. A method of processing a digital image to produce an enhanced digital image, comprising the steps of:
   a) receiving a source digital image;
   b) receiving a rendering tone scale function wherein the rendering tone scale function is a nonlinear function that has an absolute magnitude slope in the middle of the function domain that is greater than or equal to the absolute magnitude slope at either extreme of the function domain;
   c) using the rendering tone scale function to calculate a de-rendering tone scale function;
   d) receiving or calculating an adjustment tone scale function;
   e) combining the de-rendering, rendering, and adjustment tone scale functions to form an enhancement tone scale function; and
   f) using the enhancement tone scale function and the source digital image to produce an enhanced digital image.

2. The method of claim 1 wherein step c) includes calculating the de-rendering tone scale function as the mathematical inverse of the rendering tone scale function.

3. The method of claim 1 wherein step e) includes combining the tone scale functions has the form $E(\ )=R_2(A(R_1(\ )))$ wherein $E(\ )$ denotes the enhancement tone scale function, $R_2(\ )$ denotes the rendering tone scale function, $R_1(\ )$ denotes the de-rendering tone scale function, and $A(\ )$ denotes the adjustment tone scale function.

4. The method of claim 1 wherein step f) the enhancement tone scale function has the form $q=E(p)$ wherein $E(\ )$ denotes the enhancement tone scale function, p denotes a pixel value of the source digital image, and q denotes a pixel value of the enhanced digital image.

5. The method of claim 1 further including the steps of:
   i) receiving a plurality of rendering tone scale functions;
   ii) receiving an image source identification tag indicating the origin of the source digital image; and
   iii) selecting the rendering tone scale function to be used for processing the source digital image from the plurality of rendering tone scale functions on the basis of the image source identification tag.

6. The method of claim 1 further including the step of using the pixel values of the source digital image to calculate the adjustment tone scale function.

7. The method of claim 1 wherein step d) further includes the steps of:
  i) receiving an adjustment parameter from a user interface; and
  ii) using the adjustment parameter to calculate the adjustment tone scale function.

8. The method of claim 1 wherein the adjustment tone scale function is calculated using a linear equation.

9. The method of claim 1 wherein the adjustment tone scale function is calculated using a nonlinear equation.

10. The method of claim 1 wherein the source digital image has pixels of more than one color and a separate adjustment tone scale function and enhancement tone scale function is calculated for each of the colors of the source digital image.

11. The method of claim 1 wherein step e) further includes the steps of:
  i) generating a first exponential tone scale function;
  ii) generating a second exponential tone scale function as the mathematical inverse of the first exponential tone scale function; and
  iii) combining the de-rendering, rendering, adjustment, first exponential, and second exponential tone scale functions to form an enhancement tone scale function.

12. The method of claim 11 wherein step e) includes combining the tone scale functions using the formula $E( )=F_2(R_2(A(R_1(F_1( )))))$ where $E( )$ denotes the enhancement tone scale function, $R_2( )$ denotes the rendering tone scale function, $R_1( )$ denotes the de-rendering tone scale function, $A( )$ denotes the adjustment tone scale function, $F_1( )$ denotes the first exponential tone scale function, and $F_2( )$ denotes the second tone scale function.

13. The method of claim 11 wherein step f) the enhancement tone scale function has the form $q=E(p)$ wherein $E( )$ denotes the enhancement tone scale function, p denotes a pixel value of the source digital image, and q denotes a pixel value of the enhanced digital image.

14. The method of claim 11 further including the steps of:
  i) receiving a plurality of rendering tone scale functions;
  ii) receiving an image source identification tag indicating the origin of the source digital image; and
  iii) selecting the rendering tone scale function to be used for processing the source digital image from the plurality of rendering tone scale functions on the basis of the image source identification tag.

15. The method of claim 11 further including the step of using the pixel values of the source digital image to calculate the adjustment tone scale function.

16. The method of claim 11 wherein step d) further includes the steps of:
  i) receiving an adjustment parameter from a user interface; and
  ii) using the adjustment parameter to calculate the adjustment tone scale function.

17. The method of claim 11 wherein the adjustment tone scale function is calculated using a linear equation.

18. The method of claim 11 wherein the adjustment tone scale function is calculated using a nonlinear equation.

19. The method of claim 11 wherein the source digital image has pixels of more than one color and a separate adjustment tone scale function and enhancement tone scale function is calculated for each of the colors of the source digital image.

20. The method of claim 1 wherein step f) further includes the steps of:
  i) using the de-rendering tone scale function and the source digital image to calculate a de-rendered digital image;
  ii) using the adjustment tone scale function and the de-rendered digital image to calculate an adjusted de-rendered digital image; and
  iii) using the rendering tone scale function and the adjusted de-rendered digital image to calculate the enhanced digital image.

21. The method of claim 11 wherein step f) further includes the steps of:
  i) using the first exponential tone scale function and the de-rendering tone scale function to calculate a combined de-rendering tone scale function;
  ii) using the second exponential tone scale function and the rendering tone scale function to calculate a combined rendering tone scale function;
  iii) using the combined de-rendering tone scale function and the source digital image to calculate a de-rendered digital image;
  iv) using the adjustment tone scale function and the de-rendered digital image to calculate an adjusted de-rendered digital image; and
  iii) using the combined rendering tone scale function and the adjusted de-rendered digital image to calculate the enhanced digital image.

22. The method of claim 20 further including the step of using a spatial filter to apply the adjustment tone scale function to the de-rendered digital image to calculate an adjusted de-rendered digital image.

23. The method of claim 21 further including the step of using a spatial filter to apply the adjustment tone scale function to the de-rendered digital image to calculate an adjusted de-rendered digital image.

24. Apparatus for processing a source digital image using a rendering tone scale function, wherein the rendering tone scale function has an absolute magnitude slope in the middle of the function domain that is greater than or equal to the absolute magnitude slope at either extreme of the function domain, to produce an enhanced digital image comprising:
  a) means for calculating a de-rendering tone scale function as a function of the rendering tone scale function;
  b) means for calculating an adjustment tone scale function;
  c) means for combining the de-rendering, rendering, and adjustment tone scale functions to form an enhancement tone scale function; and
  d) means for using the enhancement tone scale function and the source digital image to produce an enhanced digital image.

* * * * *